United States Patent

Helms et al.

[11] Patent Number: 5,960,925
[45] Date of Patent: Oct. 5, 1999

[54] SYNCHRONIZING APPARATUS AND METHOD OF MANUFACTURING A SYNCHRONIZING MEMBER THEREOF

[76] Inventors: Georg Helms, Mauerackerstrasse 1, D-74391 Erligheim; Petra Kohler, Lange Strasse 15, D-71726 Benningen, both of Germany

[21] Appl. No.: 08/968,717

[22] Filed: Nov. 12, 1997

[30] Foreign Application Priority Data

Nov. 16, 1996 [DE] Germany ............................ 196 47 524
Jan. 11, 1997 [DE] Germany ............................ 197 00 769

[51] Int. Cl.⁶ .................................................. F16D 11/00
[52] U.S. Cl. ..................... 192/108; 192/114 T; 192/69.9; 192/53.1
[58] Field of Search ................................ 192/53.1, 53.34, 192/53.35, 69.83, 69.9, 69.91, 108, 53.343, 53.342, 69.71, 69.82, 114 T; 74/339

[56] References Cited

U.S. PATENT DOCUMENTS

| | | | |
|---|---|---|---|
| 1,935,965 | 11/1933 | Wahlberg | 192/69.9 X |
| 3,043,414 | 7/1962 | Peras | 192/114 T |
| 3,249,188 | 5/1966 | Maina | 192/69.9 X |
| 3,894,619 | 7/1975 | Bibbens | 192/69.9 X |
| 4,727,968 | 3/1988 | Chana | 192/108 X |
| 4,998,445 | 3/1991 | Fujiwara | 192/53.34 X |
| 5,626,213 | 5/1997 | Janiszewski | 192/114 T X |

FOREIGN PATENT DOCUMENTS

| | | | |
|---|---|---|---|
| 0005645 | 11/1979 | European Pat. Off. | 192/114 T |
| 2557946 | 7/1985 | France | 192/108 |
| 0054821 | 3/1984 | Japan | 192/108 |

*Primary Examiner*—Charles A Marmor
*Assistant Examiner*—Ha Ho
*Attorney, Agent, or Firm*—William B. Kircher; Shook, Haroy & Bacon

[57] ABSTRACT

A synchronizing apparatus for transmissions and a method of manufacturing a synchronizing member therefore are disclosed. The synchronizing member is adapted to be shifted along a shift direction during gearshift. The synchronizing member has teeth protruding from a synchronizing member surface. The teeth have a trapezoidal cross-section along a direction perpendicular to the shift direction and are configured with a tip along the shift direction. A front apex line of the tip projects under a first angle ($\phi$) from the synchronizing member surface. The tip is constituted by two inclined front surfaces extending on both sides of the apex line. The front surfaces intersect under a second angle ($\gamma$) in an upper tooth surface. For making the second angle ($\gamma$) as small as possible the front surfaces are provided with an upper section canted away from the tip.

9 Claims, 4 Drawing Sheets

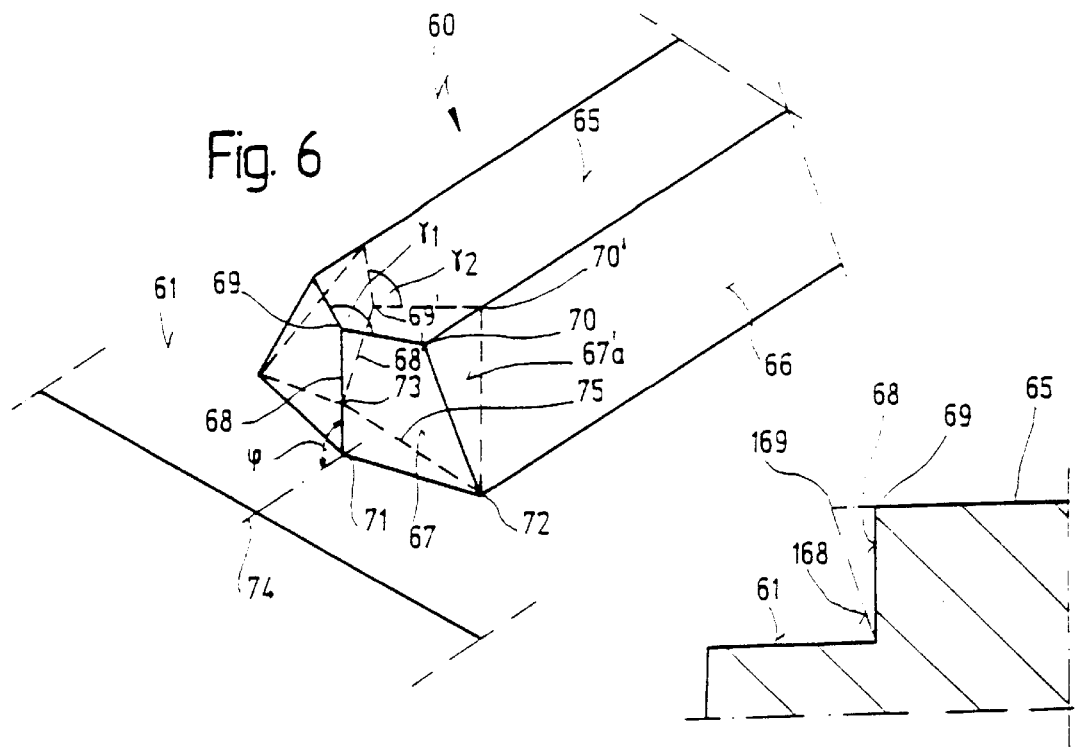
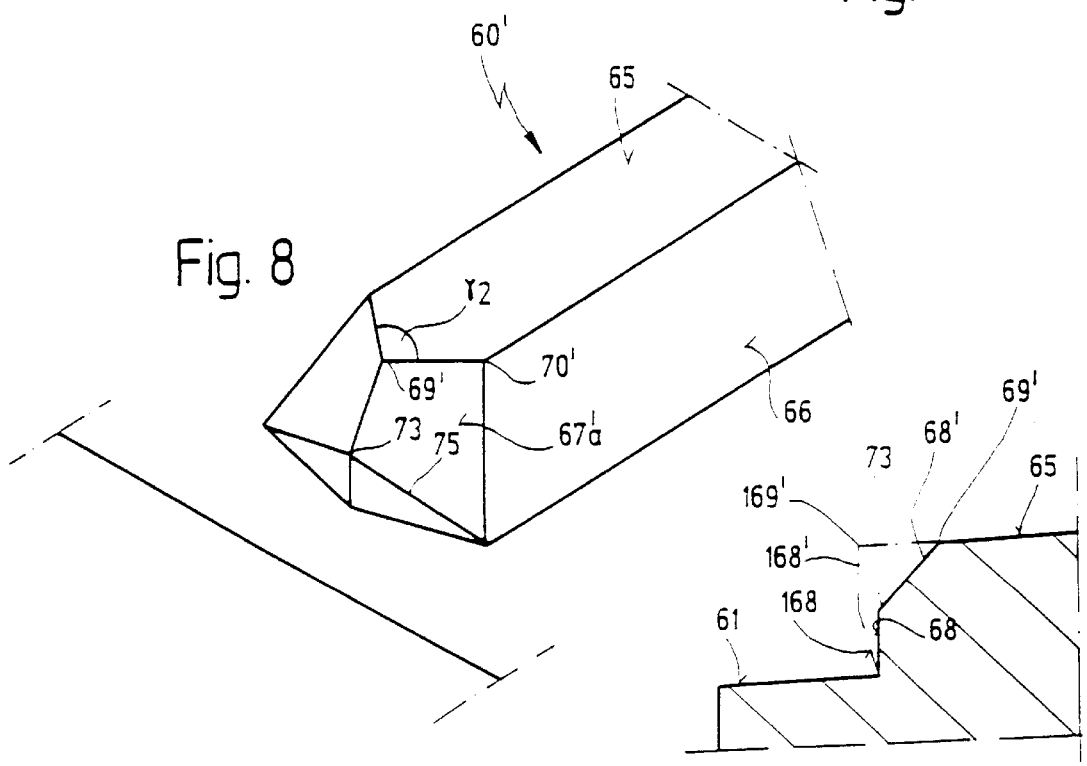

SYNCHRONIZING APPARATUS AND METHOD OF MANUFACTURING A SYNCHRONIZING MEMBER THEREOF

FIELD OF THE INVENTION

The invention relates to the field of synchronizing apparatuses for transmissions, in particular for transmissions of motor vehicles.

More specifically, the invention relates to a synchronizing apparatus for transmissions comprising a synchronizing member adapted to be shifted along a shift direction during gearshift and, further, relates to a method of manufacturing such synchronizing member. The synchronizing member has teeth protruding from a synchronizing member surface. The teeth have a trapezoidal cross-section along a direction perpendicular to the shift direction and are configured with a tip along the shift direction. A front apex line of the tip projects under a first angle $\phi$ from the synchronizing member surface. The tip is constituted by two inclined front surfaces extending on both sides of the apex line. The front surfaces intersect under a second angle $\gamma$ in an upper tooth surface. For making the second angle $\gamma$ as small as possible, the front surfaces are provided with an upper section canted away from the tip.

BACKGROUND OF THE INVENTION

In the field of transmissions, in particular of transmissions for motor vehicles, it is well-known to manufacture the synchronizing apparatuses from a sintered metal. This holds true, in particular, for gearshift sleeves, synchronizing rings and the like.

Synchronizing components of the afore-mentioned kind are commonly configured as toroidal components. A peripheral surface of these synchronizing components is provided with teeth extending in an axial direction. The teeth protrude from the peripheral surface and have a trapezoidal cross-section in a direction perpendicular to the gearshift axis.

It is, further, well-known in the art to provide teeth on such synchronizing components with acute tips for facilitating the synchronizing process, in particular for inserting the teeth between corresponding counter-teeth of a complementary synchronizing component, for example of a coupling ring.

Such components, for example gearshift sleeves were manufactured from metal, in particular from steel, in earlier times. However, it has become more and more common to manufacture such components by sintering production methods. During such methods a sintering powder is compressed within an appropriate mold under high pressure. The pressurized component, also referred to in the art as "green" component, is then transferred into a sintering furnace and is sintered at high temperature.

During the sintering of such synchronizing component, various problems may occur related to the sintering process, in particular when the configuration of the tips provides for a tip angle being lower than a certain threshold value. While it is possible without any particular problems to manufacture teeth by sintering when the tip is designed with an obtuse angle, for example between 110° and 180°, problems arise when the teeth are designed to be more acute. The reason for such problems resides in the fact that for sintering such acute tips corresponding tools are required being configured with the same acute tips. These acute tips, however, are subjected to extreme loads, both mechanical and thermal loads, when the sintering powder is compressed. If, however, the teeth on the metal tools are designed with two acute angles, these acute tips do not withstand the loads during mass production and tend to score with the adjoining material of other tool components.

However, for certain synchronizing apparatuses, in particular for the so-called coupled multiple cone synchronizing apparatuses, it is highly desired to configure the tooth tips with acute angles because the gearshift comfort may then be improved significantly.

The afore-mentioned problems do not only arise during the compression of the initially loose sintering powder. Instead, they also arise during the subsequent so-called calibration, i.e. the post-deformation of the already stable sintering components which is used for achieving the utmost dimensional accuracy.

It is, therefore, an object underlying the invention to improve prior art synchronizing apparatuses of the kind mentioned at the outset such that they are adapted to be manufactured by sintering processes without problems while having acute teeth angles at the tooth tips.

Further, it is an object underlying the invention to improve a method of the kind specified at the outset such that the manufacturing of synchronizing members with acute teeth tip angles becomes possible with sintering processes.

SUMMARY OF THE INVENTION

These and other objects of the invention are achieved by an apparatus and a method of the above-mentioned kind in which the front surfaces are provided with an upper section canted away from the tip.

The invention solves the underlying object completely.

During the sintering of synchronizing members with protruding teeth the transitions between the tooth body and the peripheral synchronizing member surface is particularly critical. Assuming a relatively big radius of the toroidal synchronizing member the peripheral surface at the transition to the protruding teeth lateral surfaces may macroscopically be considered as being plane.

In conventional apparatuses and methods a smaller, i.e. a more acute tip angle had to be generated by compressing the tooth tip in a direction parallel to the synchronizing member surface, both during first compression and during calibration. When doing so considerable shear loads were exerted in the transitional surface area and, as a consequence, so-called sintering bridges were destroyed. In contrast, the apparatus and the method according to the present invention provide for a reduction of the tooth tip angle only in the upper portion of the tooth tip. By doing so the transition between the tooth body and the synchronizing member surface is in no way affected so that the sintering bridges within that transitional area remain unaffected, too.

When the tooth tips are made more acute in the upper tooth portion only, i.e. in a portion distant from the synchronizing member surface, then this does not result in a deterioration of the function of the synchronizing apparatus as such. The respective counter-member, for example the coupling ring relative to a gearshift sleeve, does not engage the toothing of the synchronizing member over the entire tooth depth but only over a certain height, commonly the lower half.

In accordance with the present invention, essentially this portion of the tooth tips being important for the mutual engagement of the synchronization elements is modified in the meaning of a smaller tip angle. The configuration to the extent as it deviates from that of conventional teeth is, thus, limited to this portion being not sensible with respect to the deformation of endangered sintering bridges.

By doing so it has become possible for the first time to also manufacture synchronizing members with acute teeth as required for the above-mentioned coupled multiple synchronizing apparatuses by sintering processes, which has not been possible heretofore.

Sintering methods being relatively cheap can, hence, also be used for the manufacture of synchronizing members with acute teeth which was not possible before.

In order to make the tips of the teeth more acute in the meaning of the above description, various configurations may be used.

According to a first embodiment of the invention, the front surface is canted along a diagonal line extending from an upper end of the apex line to a lower lateral corner of the front surface.

According to another embodiment of the invention the front surface is canted along a diagonal line extending from a point on the apex line to a lower lateral corner of the front surface. Insofar, it is preferred that the point is located in a lower half of the apex line. In a further modification of this embodiment the apex line comprises two sections intersecting at this point under an angle.

These embodiments which should only be understood as an example, have the advantage that the reduction in the tooth tip angle is effected along simple and well-defined geometrical surfaces, in particular planes. Hence, the corresponding tools have a very simple and cheap configuration.

The selection among the many possible configuration depends on the particular requirements of the specific application.

In this as well as in other embodiments of the invention the area at the lower lateral corner of the front surface may be configured as a hollow area above the synchronizing member surface.

This feature has the advantage that the most sensible area of the teeth, namely the above-mentioned transition between the tooth body and the synchronizing member surface is entirely deleted in the area of the tooth tips so that during the deformation of the tooth tips, in particular during the calibration, these non-existing areas may consequently not be affected.

The invention may be used for various basic configurations of teeth.

Hence, the invention may be used independently of whether the first angle being the angle between the front apex line of the tip and the surface in the shift direction of the synchronizing member is acute or obtuse or a right angle.

Further advantages may be taken from the description and the enclosed drawing.

It goes without saying that the afore-mentioned features and those that will be described hereinafter may not only be used in the particular given combination but also in other combinations or alone without leaving the scope of the present invention.

BRIEF DESCRIPTION OF THE DRAWINGS

Various embodiments of the invention are shown in the annexed drawing and will be discussed in further detail throughout the subsequent description.

FIGS. 6 through 9 are illustrations, similar to those of FIGS. 4 and 5, however, with two additional cross-sectional views for a further illustration of another embodiment of the invention.

In FIG. 1 reference numeral 10 as a whole indicates an apparatus as used in a sintering process for manufacturing a tooth 11 of a synchronizing member (the rest of which not being shown), for example a gearshift sleeve of a vehicle transmission.

Figure 1:
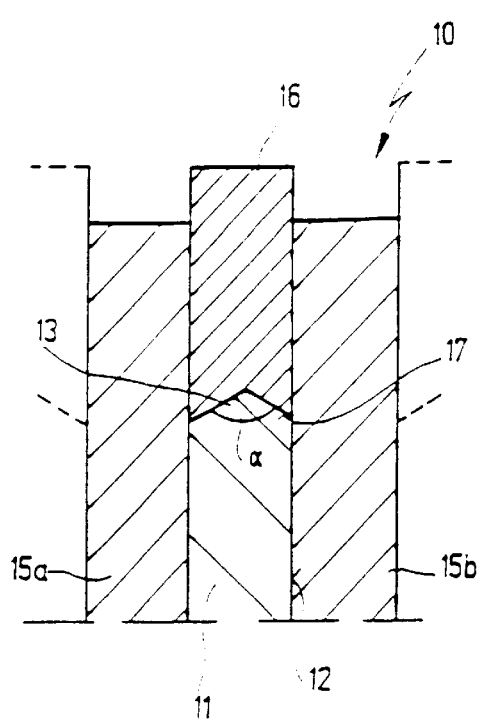
FIG. 1 is a highly schematic cross-sectional view of a tool for the manufacture of a tipped toothing of a synchronizing member where the tooth tip is configured relatively obtusely.

Tooth 11, as viewed in an axial direction, i.e. in the direction of gearshift of the synchronizing member, has two lateral surfaces 12 as well as a tip 13. The angle at tip 13 is designated with $\alpha$. Tooth 11 shown in FIG. 1 is relatively obtuse. Angle $\alpha$, hence, is between 110 and 180°.

For manufacturing tooth 11 by a sintering method, an apparatus may be used comprising two die portions 15a, 15b adjoining lateral surfaces 12 of tooth 11 to be manufactured and/or calibrated. Die portions 15a, 15b, further, are used for guiding a second die portion 16 being introduced from above in FIG. 1 onto tip 13 of tooth 12. For generating or calibrating, respectively, tip 13 second die portion 16 at its front end has a shape 17 being complementary to tip 13.

During the insertion of second die portion 16 between the gaps of first die portions 15a, 15b, tooth 13 is compressed or calibrated, respectively, under high pressure. Hence, considerable loads are exerted on the tools, in particular in the area of the tips and, consequently, the local temperature drastically increases.

However, the sintering manufacture of teeth 11 with tips 13 as configured according to FIG. 1 does not present any particular problems.

Figure 2:
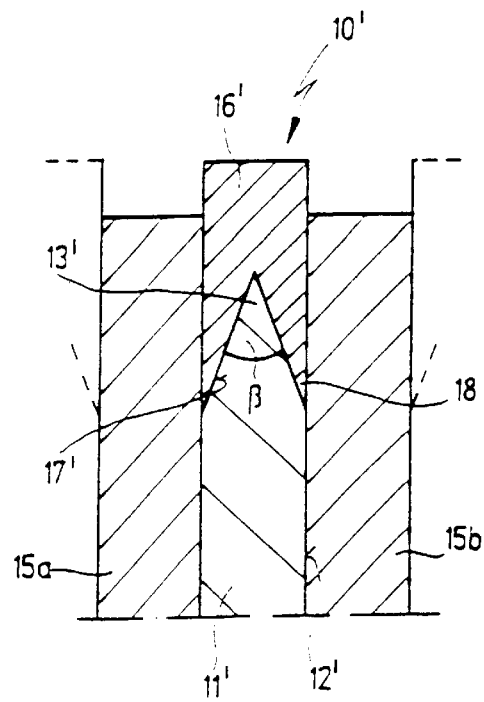
FIG. 2 is an illustration, similar to that of FIG. 1, however, for a tooth with a relatively acute tooth tip.

FIG. 2 shows the same situation as in FIG. 1, however, tooth 11' has a tip 13' with a much smaller tip angle $\beta$.

It is well-known in the art to provide synchronized vehicle transmissions with so-called multiple-cone synchronizers. Such synchronizers have an outer and an inner synchronizing ring, coupled with each other, and allow to provide lock angles of e.g. 45° as are requested for a comfortable shifting action (rotation of the shifted wheel or wheel set, respectively, after synchronism has been reached).

If apparatus 10' of FIG. 2 is configured for an angle $\beta 45°$, contour 17' at the front end of second die portion 16' will have very thin and acute front ends 18.

If, in such a situation second die portion 16 is inserted with high compression forces, one has to expect that in view of the very thin design of acute ends 18, ends 18 will score with the material of the adjoining elements and/or will be deflected outwardly after a few cycles. Such a tool would be entirely worn after a short period of operation time.

Due to the strength of conventional tools a threshold exists for lock angles that may be manufactured by sintering processes, with the threshold value lying in the order of 55 to 60°. Therefore, gearshift sleeves for multiple-cone synchronizers which might use the comfort advantages of this synchronizer design, i.e. the above-mentioned acute teeth, may not be manufactured with conventional sintering processes.

Figure 3:
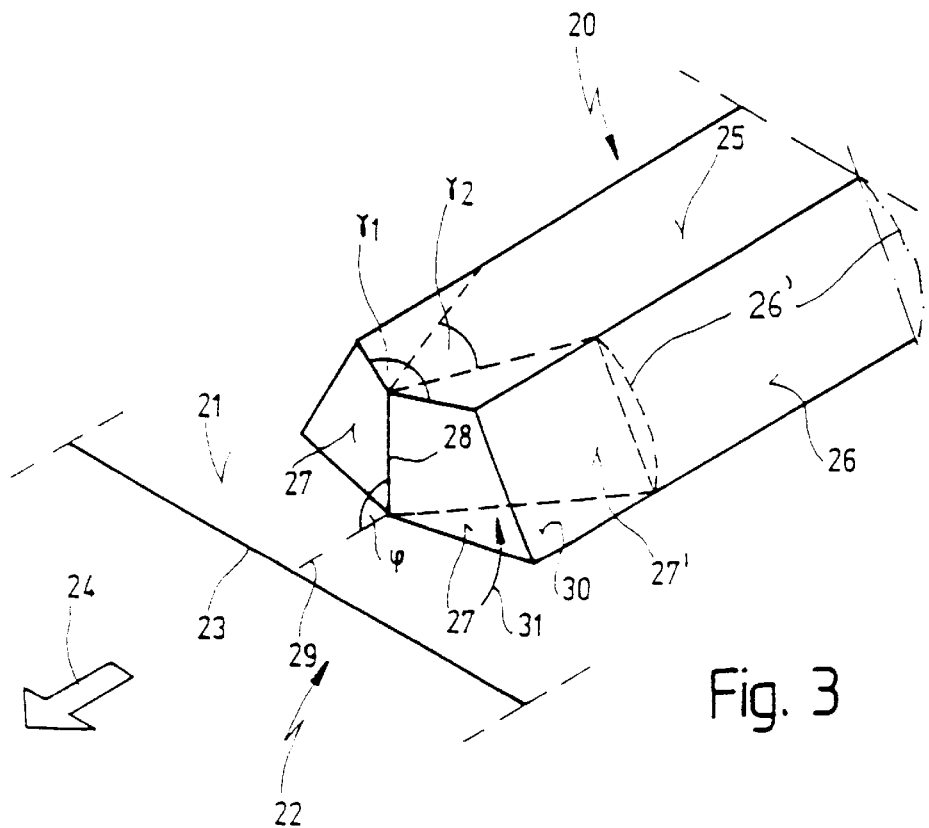
FIG. 3 is a perspective view of a tooth of a synchronizing member for illustrating a first embodiment for making the tip angle more acute.

FIG. 3 shows a tooth of such synchronizing member in a perspective view. Tooth 20 protrudes from a peripheral surface, for example an inner surface 21 of a gearshift sleeve 22. A front edge of gearshift sleeve 22 is indicated at 23. It goes without saying that edge 23 may be situated closer to tooth 20 or farther away from the latter.

Reference numeral 24 indicates the conventional gearshift direction of the gearshift sleeve when shifting-in the synchronizer.

Tooth 20 in a radial cross-section has an essential trapezoidal cross-sectional shape. Hence, it has an essentially plane upper surface 25 as well as inclined lateral surfaces 26. Lateral surfaces 26 are usually curved, in particular configured as an involute, as indicated at 26' in FIG. 3. For the sake of simplicity the lateral surfaces are depicted in the figures as planes. The tip as such is configured by two front surfaces 27 intersecting at the front end along an apex line 28. Apex line 28 assumes a predetermined angle $\phi$ with respect to a centerline 29 of tooth 20. Angle $\phi$ may be acute or obtuse or may be a right angle.

Within upper surface 25 front surfaces 27 enclose between each other an angle $\gamma$.

In FIG. 3 the illustration in solid lines corresponds to a conventional tooth of obtuse configuration having an angle $\gamma_1$ greater than the required e.g. 45°.

Therefore, for solving the above-discussed problem, one could in a first process step sinter such an obtuse tip with $\gamma_1$ being for example $\gamma_1=55°$. In a second process step, for example in a so-called calibration step, being necessary anyway, one could make angle $\gamma_1$ smaller, for example make $\gamma_2=45°$.

If this were done according to FIG. 3 as shown in dashed lines, this would not be successful. For, if tooth 20 were deformed as shown in FIG. 3 from solid lines to dashed lines, the tooth tip would simply be compressed from both lateral sides as indicated by arrow 31 in FIG. 3.

In such a situation, however, base area 30 of tooth 20, i.e. the transition between the tooth body and surface 21 would be subjected to essential shear loads which, in turn, would result in a destruction of the so-called sintering bridges. The more acute tooth would, hence, not be mechanically stable and could not be used in practice.

Figure 4:
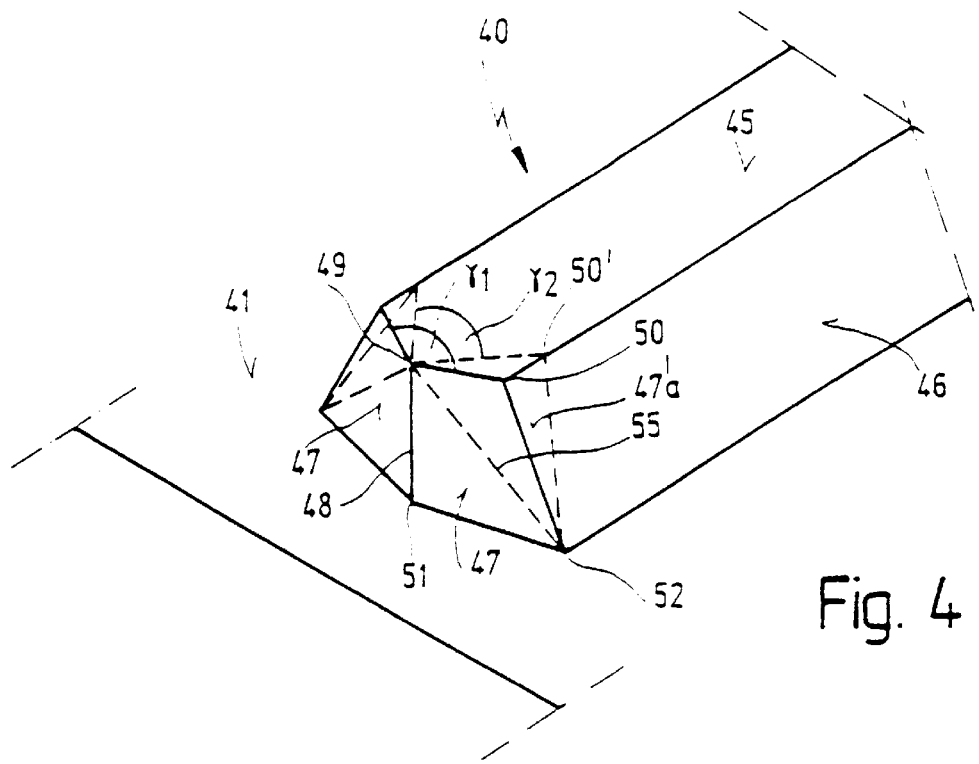
FIGS. 4 and 5 are illustrations, similar to that of FIG. 3, however, for illustrating another embodiment of the invention.

FIG. 4 in a similar perspective view shows a tooth 40 protruding from an inner surface 41 of a synchronizing member. Tooth 40 comprises an upper surface 45, lateral surfaces 46 as well as front surfaces 47 intersecting along a front apex line 48. In the area of the tip a center upper corner is indicated at 49. 50 designates lateral upper corners and 51 a center lower corner, whereas the corresponding lateral lower corners are associated to reference numerals 52. Hence, the right hand front surface 47 of FIG. 4 is delimited by corners 496 50, 52 and 51 (in a clockwise direction).

In order to deform a more obtuse angle $\gamma_1$ into a more acute angle $\gamma_2$, front surfaces 47 are canted along diagonal lines 55. Diagonal lines 55 extend from center upper corner 49 in an inclined direction down to lateral lower corners 52. This results in a flattening or impression, respectively, in particular in the area of lateral upper corner 50 being displaced by this deformation process step as indicated at 50' in FIG. 4. The upper section of front surfaces 47 is now canted along the above-mentioned diagonal line 55 as indicated at 47'a, in FIG. 4.

By means of this deformation or transformation we now have a more acute angle $\gamma_2$ in the transition of the front surface upper sections 47'a into upper surface 45.

As can easily be seen from FIG. 4, this deformation is restricted to an area being at a distance above synchronizing member surface 41. Therefore, no loads whatsoever and, hence, no shear loads that might result in a destruction of sintering tooth 40.

Although it is certainly true that the more acute configuration $\gamma_2$ of teeth 40 is essentially restricted to the upper portion of teeth 40, this is, however, meaningless for the function of the synchronizer. For, the teeth of the counterbody engage (from above in FIG. 4) not down to the full tooth depth of teeth 40 (the degree of overlap in practice is between 60% and 90%) so that they essentially come to rest against the more acute tip $\gamma_2$.

Figure 5:
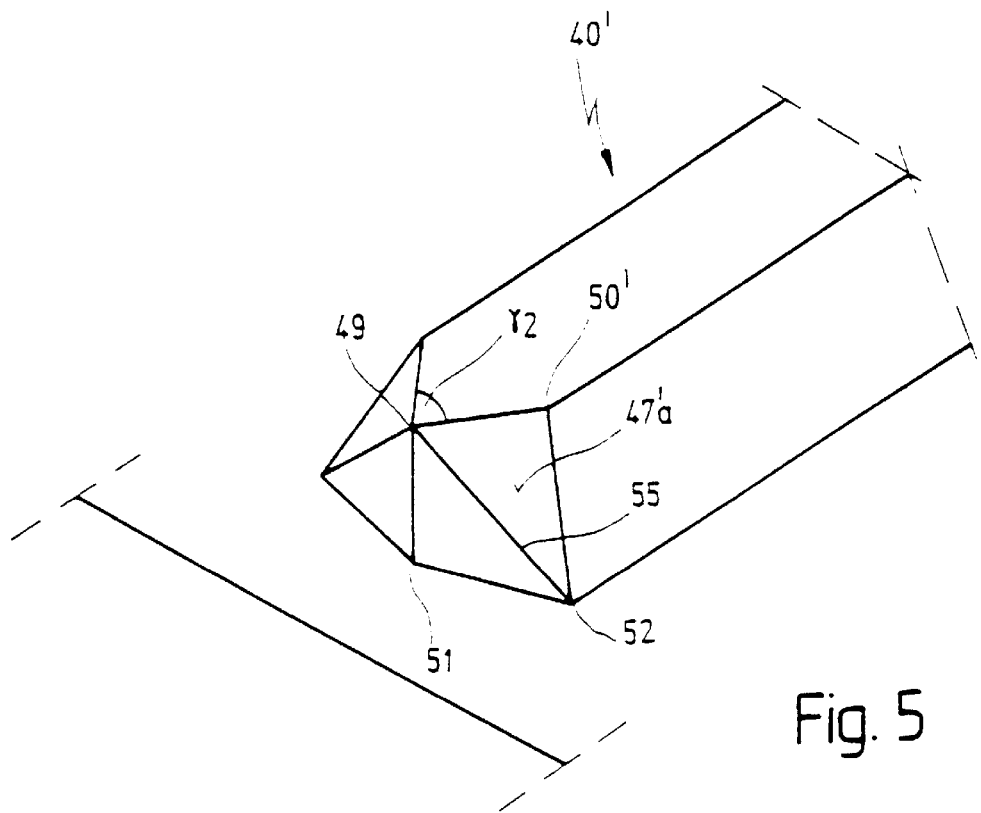

FIG. 5 shows tooth 40' after the deformation has been completed.

A similar situation is illustrated in FIGS. 6 through 9 for another embodiment of the invention.

Tooth 60, again, protrudes from an inner surface 61 of a synchronizing member. Tooth 60 has an upper surface 65, lateral surfaces 66 and front surfaces 67, intersecting at an apex line 68. The configuration of teeth 60 prior to any deformation is shown in FIG. 6 in solid lines and entirely corresponds to the configuration of teeth 40 in FIG. 5.

Accordingly, the above-mentioned corners, i.e. center upper corner 69, lateral upper corners 70, center lower corner 71 as well as lateral lower corners 72 are provided.

In contrast to the embodiment of FIGS. 4 and 5 the embodiment of FIGS. 6 through 9 provides for an intermediate corner 73 being located, for example, at half height of apex line 68. However, it may also be located at other vertical positions.

Considering now diagonal lines 75 extending from intermediate corner 73 to the two lateral lower corners 72, one could cant or fold, respectively, front surfaces 67 about diagonal lines 75 in a rearward direction.

As diagonal lines 75 do not extend through center upper corner 69, the latter is displaced after deformation to 69', i.e. in a rearward direction relative to the shifting direction. Lateral upper corners 70, too, are displaced in a rearward direction as indicated at 70' in FIG. 6.

Seen as a whole, angle $\gamma_1$ is deformed into a more acute angle $\gamma_2$. Deformed tooth 60' is depicted in FIG. 8 for comparison purposes in solid lines and in a perspective view.

The two cross-sectional views of FIGS. 7 and 9 illustrate in solid lines the details described before. The sections of FIGS. 7 and 9 are made along a center line 74 through tooth 60 in a longitudinal direction.

As one can clearly see from FIG. 9, a lower section 68 of the apex line remains unaffected after deformation, however, the apex line is canted away at intermediate corner 73 in a more inclined direction and in a rearward direction as indicated at 68'.

FIGS. 7 and 9 show the situation where angle $\phi$ (FIG. 6) is 90°. Hence, apex line 68 emerges from surface 61 in a perpendicular direction.

Further, other tooth configurations are known in the art in which apex line 68 emerges under an acute or under an obtuse angle relative to the shift direction (center line 74 in a forward direction). FIGS. 7 and 9 illustrate in dash-dot lines the case that the angle is an acute angle so that the teeth 60 are inclined in a forward direction. In FIG. 7 the apex lines is indicated at 168 and the center upper corner at 169.

If a tooth of this configuration is deformed as described before, an upper canted section of apex line 168' is generated extending again in a perpendicular direction with respect to the surface.

Figure 10:
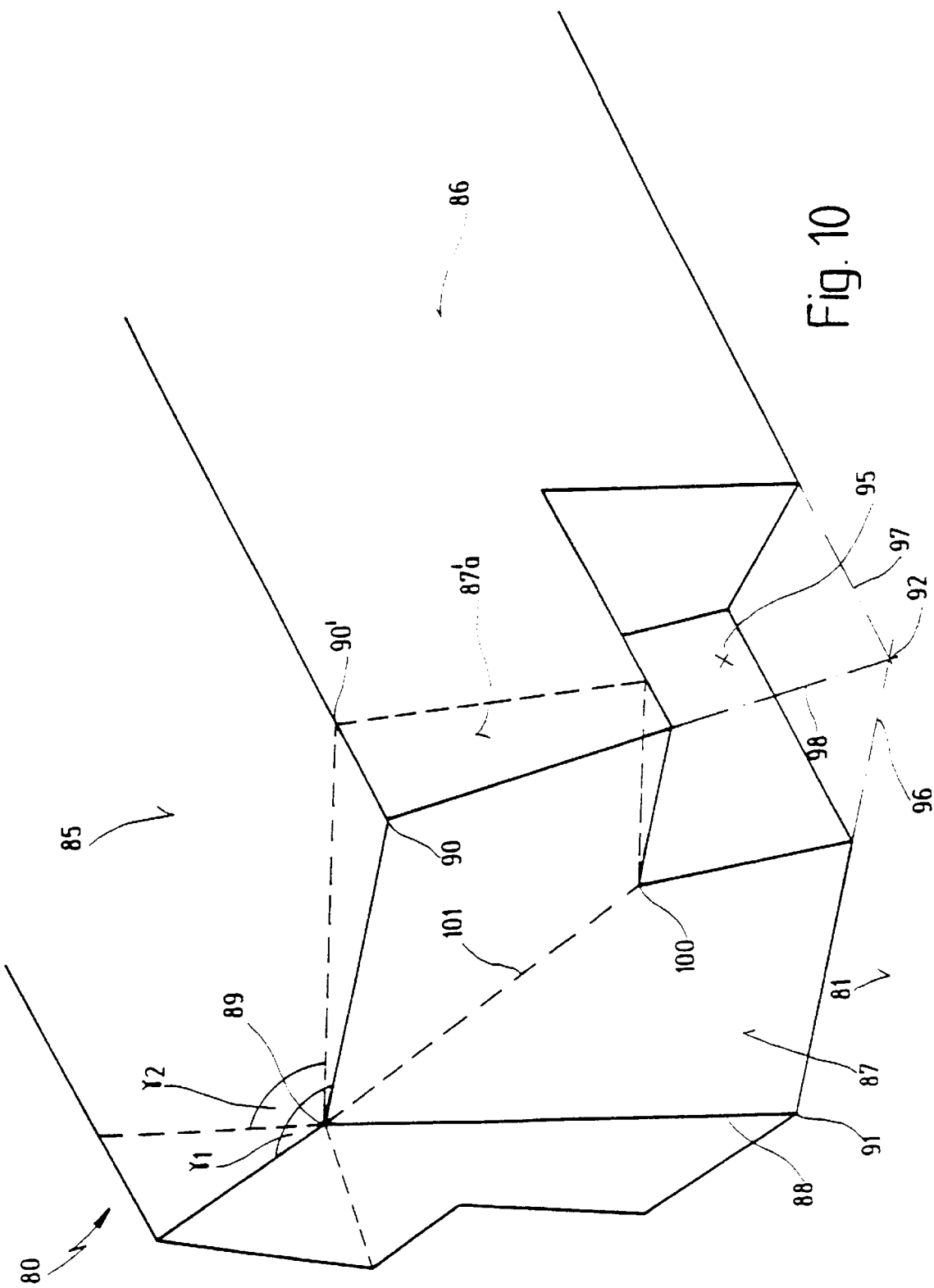
FIG. 10 is an illustration similar to that of FIGS. 4 and 6, however, in highly enlarged scale, for still another embodiment of the invention.

FIG. 10 finally shows still another embodiment of the invention considering that the most sensible area with respect to the risk of destroying sintering bridges might be made void of any material.

In FIG. 10 a tooth 80 again protrudes from an inner surface 81 of a synchronizing member. Tooth 80 has an upper surface 85, lateral surfaces 86 and front surfaces 87. The apex line is indicated with 88. The upper and lower corners, described above several times are designated with 89, 90, 91 and 92. Lateral lower corners 92, however, are only theoretical geometrical points.

As one can clearly see, the area at the lateral lower corners 92 is configured as a hollow corner area 95. Corner area 95 is delimited by areas 96, 97 and 98 constituting the transition of front sides 87 and lateral sides 86, respectively, to inner face 81 (96 and 97) and, respectively, the transition between front sides 87 and lateral sides 86 (98).

Corner area 95, therefore, generates an internal corner 100 within front surface 87. From this internal corner 100 a diagonal line 101 extends to center upper corner 89. Front surface 87 may be canted or folded, respectively, about this diagonal line 101 in a rearward direction so that an upper section 87'*a* of front surface 87 is generated. The two lateral upper corners 90 are thus displaced in a rearward direction as indicated at 90'. This, again results in a reduction of the angle at the tip of tooth 80 from $\gamma_1$ to $\gamma_2$.

It goes without saying that the technology illustrated in FIG. 10 may be combined with various configurations, for example with the configuration according to FIGS. 6 through 9.

We claim:

1. A synchronizing apparatus for transmissions comprising a synchronizing member adapted to be shifted along a shift direction during gearshift, said synchronizing member having teeth protruding from a synchronizing member surface, said teeth having a trapezoidal cross-section along a direction perpendicular to said shift direction and being configured with a tip along said shift direction, a front apex line of said tip projecting under a first angle ($\phi$) from said synchronizing member surface, said tip being constituted by two inclined front surfaces extending on both sides of said apex line, said front surfaces intersecting under a second angle ($\gamma$) in an upper tooth surface, wherein said front surfaces are provided with an upper section canted away from said tip.

2. The apparatus of claim 1, wherein said front surface is canted along a diagonal line extending from an upper end of said apex line to a lower lateral corner of said front surface.

3. The apparatus of claim 1, wherein said front surface is canted along a diagonal line extending from a point on said apex line to a lower lateral corner of said front surface.

4. The apparatus of claim 3, wherein said point is located in a lower half of said apex line.

5. The apparatus of claim 3, wherein said apex line comprises two sections intersecting at said point under an angle.

6. The apparatus of claim 1, wherein said front surface is canted along a diagonal line extending from an upper end of said apex line to a lower lateral corner area of said front surface, said lower lateral corner area being configured as a hollow area above said synchronizing member surface.

7. The apparatus of claim 1, wherein said first angle ($\phi$) is an acute angle of less than 90°.

8. The apparatus of claim 1, wherein said first angle ($\phi$) is an obtuse angle of more than 90°.

9. The apparatus of claim 1, wherein said first angle ($\phi$) is 90°.

* * * * *

UNITED STATES PATENT AND TRADEMARK OFFICE
CERTIFICATE OF CORRECTION

PATENT NO. : 5,960,925
DATED : October 5, 1999
INVENTOR(S) : Georg Helms and Petra Kohler It is certified that error appears in the above-indentified patent and that said Letters Patent is hereby corrected as shown below:

On the title page, insert item [73], as follows:

"Assignee: GETRAG Getriebe- und Zahnradfabrik, Ludwigsburg, Germany"

At col. 5, line 56, please delete "496" and replace with --49--.

Signed and Sealed this

Twelfth Day of December, 2000

Attest:

Q. TODD DICKINSON

Attesting Officer

Director of Patents and Trademarks